United States Patent Office 3,379,649
Patented Apr. 23, 1968

3,379,649
PREPARATION OF HALOPHOSPHATE
PHOSPHOR
Ivie Lee Smith, Cleveland, Ohio, assignor to General
Electric Company, a corporation of New York
No Drawing. Filed Dec. 17, 1964, Ser. No. 419,233
3 Claims. (Cl. 252—301.4)

ABSTRACT OF THE DISCLOSURE

In the manufacture of calcium halophosphate phosphors the use of calcium oxalate as a partial or complete substitute for calcium-fixing additives in the batch results in greatly decreased sintering of the phosphor materials. The effect is sufficient to allow the production of such phosphors with one firing in vessels open to the air, rather than the two firings which were required previously.

---

This invention relates to halophosphate phosphors, and to methods for their preparation. More particularly, the invention relates to calcium halophosphate phosphors activated with antimony and manganese and with their preparation.

Calcium halophosphate is represented by the formula $Ca_5(PO_4)_3X$ where X is the halogen content and in this case is fluorine or chlorine or a mixture thereof. Phosphors based on this substance and activated with antimony and manganese may be represented by the formula $Ca_5(PO_4)_3(Cl,F):Sb,Mn$. Activator proportions are known in the art and generally fall in the range 0.5 to 1.5% by weight of the total phosphor for antimony and 0.5 to 3.0% by weight for manganese. With the mixed halogen phosphor, the chlorine usually will not be less than 0.05 mole and the fluorine usually will not be more than 0.95 mole. Exact concentrations of the activators and relative proportions of the halogens are determined by the color temperature desired from the phosphor, as further described in U.S. Patent 3,109,819, Gillooly et al., assigned to the same assignee as the present application. Other divalent cations may, as is known in the art, be partially substituted for calcium, such as cadmium, strontium, barium, magnesium and zinc, preferably in amounts less than 0.50 atom per mole of phosphor, thus leaving a phosphor still having the general formula of a calcium halophosphate.

The preparation of such phosphors includes mixing together powdered raw materials, providing the required phosphor constituents, and firing the mixture to react the raw materials and form the desired phosphor. Known methods of preparation have included many different raw materials which furnish the desired composition, but the most satisfactory ingredients for providing reproducible and controlled compositions are usually $CaHPO_4$, $CaCO_3$, $CaF_2$, $NH_4Cl$, $Sb_2O_3$, and $MnCO_3$. Reaction of these materials is brought about by heating at a temperature generally in the range of 1100° to 1200° C. for periods ordinarily between ½ and 3 hours. Firing may be in covered vessels in air whereby the reactants provide a protective atmosphere against oxidation, or in open vessels in a furnace provided with an inert atmosphere.

The raw materials listed above are satisfactory for either type of firing. However, covered vessel firing in air forms sintered phosphor cakes which are hard and are difficult to grind to the fine powders necessary for application. By contrast, phosphors formed by firing in open vessels in furnaces with atmosphere control can be soft when the furnace is provided with gases such as nitrogen or argon which are inert with respect to the reactants and products. While the latter method of firing can yield phosphors more easily brought to utilization, the cost of the special furnaces needed for such method of preparation limits its general adoption.

Accordingly, an object of this invention is to provide an improved method for producing calcium halophosphate phosphors activated with antimony and manganese.

Further objects are to provide a method for the preparation of phosphors in which the phosphors can be fired in a self-generated atmosphere in an air furnace rather than in a controlled-atmosphere furnace, with the resulting phosphor requiring less comminution due to the softer nature of the fired cake as compared with prior art phosphors produced in air furnaces. This is to be accomplished while maintaining the phosphors equal to or superior to prior art phosphors in terms of control, reproduction, brightness, maintenance and cost.

Briefly stated, in one embodiment of the invention, these objectives are satisfied by the use of calcium oxalate, $CaC_2O_4$, or its monohydrate, $CaC_2O_4 \cdot H_2O$ as a substitute for part or all of the calcium carbonate in the raw material mixture. This method will allow for fixing the calcium content of the phosphor in addition to providing a softer phosphor cake than produced with calcium carbonate alone. The invention is specific to the use of calcium oxalate in the production of calcium halophosphates, which method I have found to have particular merit. The utility of other gas generating compounds, or the utility of oxalates in other phosphors cannot be successfully predicted without empirical studies and, in some cases, independent invention. Furthermore, the total amount of calcium oxalate plus calcium carbonate can be adjusted to supply the desired quantity of calcium in the batch for more precise control of the calcium level in the resulting phosphor. Thus, compounds such as calcium oxalate and calcium carbonate are employed to fix the calcium level in the phosphor since they do not contribute active ingredients other than calcium to the phosphor. For this reason, calcium oxalate, calcium carbonate and other calcium additives which leave only calcium oxide as a residual in the phosphor will be referred to herein as calcium-fixing additives. Batches used for production of phosphors according to the invention contain, in addition to calcium-fixing additives, multi-purpose calcium additives herein defined as compounds which contribute both calcium and at least one other desired constitutent to the phosphor composition.

The choice between dehydrated calcium oxalate and its monohydrate is mainly one of economics, with the water in the monohydrate not being harmful in many phosphormaking processes. Although the monohydrate is generally less expensive, there might be applications in which the dehydrated material would be preferable. Both the dehydrated form and the monohydrate are meant herein by the name calcium oxalate.

The general process by which calcium oxalate provides the softer product will be described briefly in terms of my present theories. Since calcium halophosphate activated by antimony and manganese is the phosphor most widely used in modern fluorescent lamps, the reactions occurring during the preparation of this phosphor have been studied extensively. The covered vessels normally used in air-furnace firing of phosphors are not tightly sealed, and so they permit the atmosphere generated by the raw materials to displace the air in the vessels. With the usual raw materials, as listed above, it is known that the $CaHPO_4$ dissociates between 400° and 500° C. liberating large quantities of water vapor, and the $CaCO_3$ dissociates between 600° and 800° liberating large quantities of carbon dioxide. In addition to these two atmosphere-generating reactions, small quantities of carbon dioxide, ammonia, and water vapor are liberated below 400° C., and volatile antimony and chloride in some form or forms not yet definitely established are present above 700° C. The $CO_2$ liberated above 600° C. serves as a desirable protective atmosphere during covered vessel firing in air. However, water vapor liberated below 600° C. and trapped within the vessel until displaced by $CO_2$ causes oxidation of the manganese in the mixture from 2+ to some higher state or states. The manganese must be returned to the 2+ oxidation state for the material to become effective as a phosphor. This occurs at higher temperatures, but both the presence of manganese in higher oxidation states and the high temperature required to return it to the necessary 2+ state are believed to be main causes for sintering of the phosphor cake. Thus, it has been found that the use of calcium oxalate monohydrate as a substitute for at least part of the calcium carbonate in the batch to be fired allows the use of lower temperatures and shorter times for firing resulting in softer, less sintering phosphor cakes.

When part or all of the calcium carbonate is replaced by calcium oxalate monohydrate, the atmosphere generated by the reactants is favorably modified. The water in the oxalate is lost at 200° C. Then between 400° and 500° C. the oxalate dissociates to calcium carbonate thereby liberating carbon monoxide. The reactant-generated atmosphere at this stage is thus changed from water vapor alone to water vapor plus carbon monoxide. The latter has been found to maintain the manganese at lower oxidation states, to provide softer phosphor cakes when fired in the normal temperature range of 1100° to 1200° C., and to promote phosphor formation at lower temperatures than possible with adjustment of calcium content with calcium carbonate alone. Since the calcium oxalate dissociates to calcium carbonate, the later reaction generating the protective $CO_2$ atmosphere occurs as in the current practice described above.

When batch materials other than those mentioned above are used to produce calcium halosphate phosphors having the stated general formula, calcium oxalate can be used according to the invention as part or all of the calcium-fixing additives.

The desirable effects described do not require complete substitution of calcium oxalate for calcium carbonate in the raw material batch mixture. This can be done, but suitable substitutions in terms of both phosphor quality and economic considerations have been found to fall in the range of 10 to 70 mole percent CaO from calcium oxalate and 90 to 30 mole percent CaO from calcium carbonate. Optimum mole ratios of calcium oxalate: calcium carbonate depend on the size of the firing batch and the configuration of the firing vessel.

Example I

For a cool white, calcium halophosphate activated by antimony and manganese, the batch may consist of 6.00 moles $CaHPO_4$, 2.89 moles $CaC_2O_4 \cdot H_2O$, 0.17 mole $MnCO_3$, 0.88 mole $CaF_2$, 0.44 mole $NH_4Cl$, and 0.09 mole $Sb_2O_3$. The mixture of powdered ingredients is fired in covered trays at a temperature in the range of 1050–1170° C. for about 3 hours to effect formation of the phosphor.

Example II

Or alternatively, for the cool white phosphor given in Example I, the batch may consist of 6.00 moles $CaHPO_4$, 0.72 mole $CaC_2O_4 \cdot H_2O$, 2.17 moles $CaCO_3$, 0.17 mole $MnCO_3$, 0.88 mole $CaF_2$, 0.44 mole $NH_4Cl$, and 0.09 mole $Sb_2O_3$. The mixture of powdered ingredients is fired in covered trays at a temperature in the range 1050–1170° C. for about 3 hours to effect formation of the phosphor.

Example III

For a warm white, calcium halophosphate activated by antimony and manganese, the batch may consist of 6.00 moles $CaHPO_4$, 2.72 moles $CaC_2O_4 \cdot H_2O$, 0.34 mole $MnCO_3$, 0.88 mole $CaF_2$, 0.38 mole $NH_4Cl$, and 0.09 mole $Sb_2O_3$. The mixture of powdered ingredients is fired in covered trays at a temperature in the range of 1050–1170° C. for about 3 hours to effect formation of the phosphor.

Example IV

Alternatively, for a warm white phosphor as described in Example III, the batch may consist of 6.00 moles $CaHPO_4$, 1.36 moles $CaC_2O_4 \cdot H_2O$, 1.36 moles $CaCO_3$, 0.34 mole $MnCO_3$, 0.88 mole $CaF_2$, 0.38 mole $NH_4Cl$, and 0.09 mole $Sb_2O_3$. The mixture of powdered ingredients is fired in covered trays at a temperature in the range of 1050–1170° C. for about 3 hours to effect phosphor formation.

While specific examples have been given of preparation of the phosphors, it will be understood that various changes, omissions and substitutions may be made within the true spirit and scope of the invention as defined in the appended claims.

What I claim as new and desire to secure by Letters Patent of the United States is:

1. In the method of preparing a calcium halophosphate phosphor having the general formula $$Ca_5(PO_4)_3(X):Sb,Mn$$

wherein:

X is a halogen selected from the group consisting of F, Cl, and mixtures thereof, and in which Sb and Mn are present in activator proportions;

which comprises mixing together and firing a batch of ingredients including both multi-purpose calcium additives and calcium-fixing additives, which batch will yield said phosphor upon firing in a self-generated atmosphere in an air furnace;

the improvement which consists of employing calcium oxalate as a calcium-fixing additive in an amount of at least 10 mole percent measured as CaO of the total of the calcium-fixing additives in the batch.

2. In the method of preparing a calcium halophosphate phosphor having the general formula $$Ca_5(PO_4)_3(X):Sb,Mn$$

wherein:

X is a halogen selected from the group consisting of F, Cl, and mixtures thereof, in total amount of one mole, and in which Sb is present in the range of 0.5–1.5% by weight of the phosphor and Mn is present in the range of 0.5–3.0% by weight;

which comprises mixing together and firing a batch of ingredients comprising $CaHPO_4$, $CaCO_3$, $CaF_2$, $NH_4Cl$, $Sb_2O_3$ and $MnCO_3$ in amounts which will yield said phosphor upon firing in a self-generated atmosphere within a covered vessel in an air furnace;

the improvement which consists of employing calcium oxalate as a calcium-fixing additive as a substitutive for part of the $CaCO_3$ in an amount of about 10 to 70 mole percent measured as CaO.

3. The improved method of preparing a calcium halophosphate phosphor as in claim 2 in which the calcium-fixing compounds in the batch consist essentially of 25 mole percent calcium oxalate and 75 mole percent calcium carbonate, measured as CaO.

References Cited

UNITED STATES PATENTS

| | | | |
|---|---|---|---|
| 2,647,086 | 7/1953 | Homer | 252—301.3 |
| 2,826,553 | 3/1958 | Butler | 252—301.4 |
| 3,109,819 | 11/1963 | Gillooly et al. | 252—301.4 |
| 3,250,722 | 5/1966 | Borchardt | 252—301.4 |
| 2,780,600 | 2/1957 | Wollentin | 252—301.6 |

TOBIAS E. LEVOW, Primary Examiner.

ROBERT D. EDMONDS, Examiner.